INVENTOR
JENNY BRAMLEY

United States Patent Office 3,493,845
Patented Feb. 3, 1970

3,493,845
COHERENT LIGHT SOURCE UTILIZING MICROWAVE PUMPING OF AN ELEMENT HAVING A METASTABLE STATE AS ITS FIRST EXCITED LEVEL
Jenny Bramley, Falls Church, Va., assignor to Melpar, Inc., Falls Church, Va., a corporation of Delaware
Filed June 4, 1965, Ser. No. 461,266
Int. Cl. H01s 3/00
U.S. Cl. 332—7.51                    18 Claims

ABSTRACT OF THE DISCLOSURE

A high intensity vapor laser has a container of vapor of an element having a ground state and a plurality of excited states including a metastable state as the lowest excited state. A quenching gas is also present in the container to transfer energy to the metastable state by quenching the higher excited states upon excitation of the vapor by a pumping source which includes a source of electromagnetic microwave energy for exciting the vapor to the metastable state and for population inversion thereto. The container is partly enclosed within a microwave resonant cavity to provide coupling between the pumping source and the container, the latter having at least a portion which is transparent to light at the wavelengths to be emitted by the laser, and further coupled to a laser optical cavity.

---

The present invention relates generally to lasers and, more particularly, to lasers employing metals in which the first excited state is a metastable state and other excited states are quenched by a foreign gas with transfer of energy to the first excited state.

I have observed that intense light is emitted by plasmas containing certain metals in elemental and salt forms when such plasmas are excited by microwave fields. The plasmas contain a foreign gas that collides with metal atoms or ions. The foreign gas quenches all but the first excited state in the metal. Near extinction of all but the first excited state results in predominant or greater excitation of the first state than would otherwise be the case so that intense radiation in only one waveband is derived. These observations are more fully reported in my co-pending application entitled "Intense Incoherent Radiation Source," Ser. No. 432,149, filed Feb. 12, 1965, now U.S. Patent 3,374,393.

From these observations, it follows that plasmas comprising metal atoms in which the first excited state is metastable (e.g. magnesium, manganese, tantalum and ionized barium) and a quenching agent for the higher excited metal states are capable of exhibiting population inversion in response to microwave pumping excitation of sufficient power.

The metastable states may be of the following types:

(a) Transition to the ground state may occur by dipole radiation but the multiplicity rule is violated, i.e., they are transitions from triplet to singlet levels, etc.

(b) Transition to the ground state can occur only by quadrupole radiation.

(c) Transition to the ground state can occur only by magnetic dipole radiation.

As a rule, these transitions are extremely weak. However, in the case of population inversion, stimulated emission does occur. Therefore, when the plasma in which population inversion is produced is made part of a laser structure, such as used, e.g. for a ruby laser, lasing action takes place.

A coherent light source is provided according to the present invention by having a plasma with the requisite metal and quenching agents in a microwave field, the plasma being formed either by the microwave field or by auxiliary power means and coupling a laser optical cavity with the light energy emitted by the plasma. Quenching of excited states other than the first excited state can possibly be attained in response to collisions between atoms of the excited material.

The operating mode of the vapor laser of the present invention is more closely related to that of the solid state ruby laser than to the conventional gas laser. In the vapor laser, as in the ruby laser, the emitted radiation starts from a metastable state, though different means are used in the two instances to invert the population of the metastable state. In the vapor laser of the present invention, the metastable state, constituted by the first excited state, is reached primarily by direct pumping from a microwave field. While excitation of the metastable state is also possible by collision with a foreign gas or vapor atom or molecule which acquired its energy by quenching a higher excited state, this effect is of smaller magnitude than direct excitation. In contrast, the metastable state in the ruby, from which coherent radiation originates, is reached by optical pumping to a higher state, followed by a radiationless transition to the metastable state. In the helium-neon gas laser, on the other hand, the electric discharge in the gas excites the metastable state of the helium atom. The metastable state of the helium atom then transfers its energy by collision to a neon atom which has an excited state energetically very close to the metastable state of helium. The use of a laser cavity then gives rise to lasing action from neon. This process is much less efficient than that occuring in the vapor laser of the present invention because it is dependent solely on indirect excitation of neon atoms in contrast to primarily direct excitation of only one element in the vapor laser.

The vapor laser of the present invention can be pumped continuously since it uses microwave pumping rather than a light flash, as does the ruby laser. Of course, after each excitation cycle of the ruby laser, the system cannot be again activated for a relatively long time, on the order of seconds.

Alternately, the vapor laser of the present invention can be pulsed at rapid rates, such as a few kilocycles, according to any preselected code.

The active material of the vapor source does not need cooling since it is initially in the vapor state, whereby high temperature only improves efficiency by increasing the number of available metal atoms or ions and of electrons available for excitation.

A comparison of the number of available active elements in the vapor laser and a ruby crystal is made when it is realized that in the latter the metastable states are those of the chromium atom, present only as a 0.1% or less impurity. Population inversion therefore affects only a relatively small number of atoms as can be seen by considering that there are approximately $2 \times 10^{22}$ $Al_2O_3$ molecules and about $2 \times 10^{19}$ chromium atoms in one cubic centimeter of ruby. At a partial pressure of 10 torr for the radiating vapor in the present invention, which is a suitable operating pressure, there are $4 \times 10^{17}$ metallic atoms per cubic centimeter, i.e., 2% of the number of chromium atoms in a ruby crystal. Considering the extremely high intensity of the light emitted by the ruby, an adequate moderately high range of intensities can be achieved in the vapor without resorting to pressures approaching atmospheric.

Accordingly, an object of the present invention is to provide microwave pumping for producing population inversion in elements whose first excited state is a metastable state.

Another object of the invention is to provide plasmas comprising metals or metal ions whose first excited state is a metastable state in combination with a quenching agent for inhibiting population of other excited metal states.

Other objetcs of the invention are to provide new and improved lasers that are capable of operating (1) efficiently at room temperature and in which efficiency increases as a function of temperature; (2) without cooling; and (3) to derive either continuous or pulsed coherent radiant energy.

A further object of the invention is to provide a plasma containing ions that are excited to a metastable state at their first excited state in response to microwave pumping that causes population inversions of the excited ions.

Because a laser employing teachings of the present invention can be excited either continuously or pulsed with microsecond pulses at multikilocycle repetition rates, light modulated with pulse coded information can be derived in response to signal intelligence. In consequence, an additional object of the present invention is to provide a new and improved pulsed laser transmitting system.

In order to provide efficient microwave pumping, the plasma is subjected to microwave action inside a resonant microwave cavity. Such cavities, means of coupling them to the microwave generator, and the field configuration inside any particular type are well known in the art. The use of a cavity formed by providing a termination to a rectangular waveguide in the descriptions below is to be taken merely as an example, and in no way restricts the use of other types, such as cylindrical or coaxial cavities.

The above and still further objects, features and advantages of the present invention will become apparent upon consideration of the following detailed description of specific embodiments thereof, utilizing resonant microwave cavities, esepecially when taken in conjunction with the accompanying drawings, wherein.

Figure 1:
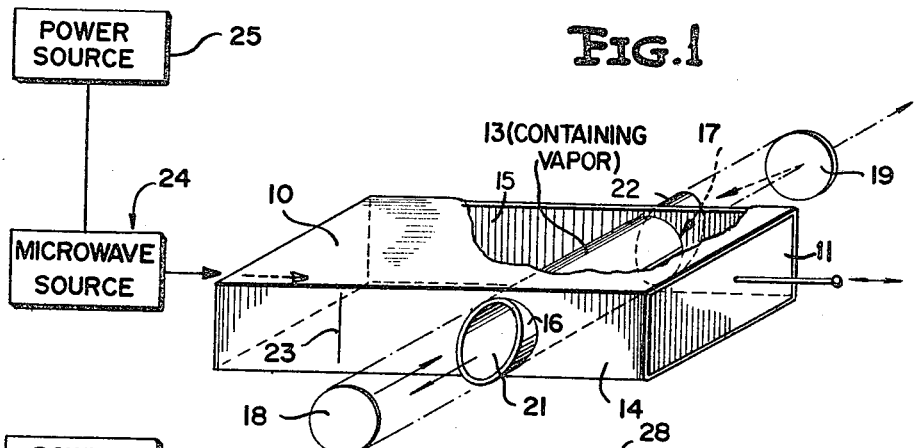
FIGURE 1 is a schematic diagram of an embodiment of the invention utilizing a rectangular resonant microwave cavity.

Reference is now made specifically to FIGURE 1 wherein a resonant microwave cavity 10 is formed by providing a sliding termination 11 to a rectangular waveguide. The termination is of the sliding type to provide a means for tuning the cavity. The narrower side walls 14 and 15 have circular apertures 16 and 17, respectively, through which is passed a cylindrical tube 13 made of dielectric material capable of withstanding high heat, such as quartz or boron nitride. The end walls 21 and 22 of tube 13 are made of a transparent material to the coherent radiation emitted by the system, such as quartz for the visible, near ultra-violet, and near infrared, and sapphire for infrared of somewhat longer wavelength. They are optically flat and inclined at Brewster's angle to the axis of tube 13. These end walls are preferably outside the waveguide but as close as is practical to apertures 16 and 17, respectively, to insure on the one hand that their optical flatness is not destroyed by excessive heating and on the other hand that they do not become cool enough to encourage deposition of the metal from the plasma and thus interfere with the emission of radiation. The diameter of apertures 16 and 17 must be as close as possible to the diameter of tube 13 to minimize disturbing and weakening the microwave field.

The axis of tube 13 is located in that plane of symmetry of the resonant microwave cavity 10 parallel to the direction of wave propagation which would occur if the waveguide were not terminated to form a resonant cavity. In that plane, the tube axis is at an angle to said direction of wave propagation. Tube 13, maintained at a partial vacuum of the order of 0.01 to 0.1 atmosphere, has included therein a metal whose atoms have as their lowest excited state, commonly called a resonant state, a metastable state. Examples of metals with a metastable resonant state are: magnesium, tungsten, chromium, antimony, palladium, bismuth, ruthenium, molybdenum, and rhenium. The atoms of these materials also possess, of course, higher excited states, but these are quenched according to the present invention, the quenching being accompanied by a nonradiative transition to the resonant state. The property of metastable resonant states is not restricted to neutral atoms, it can also occur for ions, as for example, singly ionized barium.

In the embodiment illustrated in FIGURE 1, plasma is formed from the metal under the action of the microwave field. Quenching is accomplished by a vapor or gas, such as water vapor or a partially ionized noble gas, such as argon in tube 13. The use of gases or vapors possessing a dipole moment improves the quenching efficiency. A suitable partial pressure for the quenching gas or vapor is in the range of 5 to 50 torr. In a typical arrangement, one gram of magnesium together with argon and water vapor at a combined partial pressure of 30 torr are placed in tube 13. The operating temperature determines the partial vapor pressure of magnesium.

The resonant cavity 10 is energized to the $TE_{10}$ mode by a microwave source 24, such as a magnetron, that forms and excites the plasma in tube 13 at a frequency where the plasma absorbs substantial microwave energy, one specific example of a suitable frequency being 2.5 K mc. In said mode and with the location of tube 13 as specified, the axis of tube 13 is at a right angle to the orientation of the electric vector 23 so that good penetration of the microwaves into the plasma is achieved resulting in plasma formation and excitation. A conventional power supply 25 is used to energize microwave source 24.

Positioned exteriorly of resonant cavity 10 on either side of tube end walls 21 and 22 are reflectors 18 and 19, which form a laser optical cavity, such as used with a gas laser. The design and use of laser cavities is described, e.g., in U.S. Patent No. 3,055,257, by Boyd, Fox and Li. Thus the laser cavity must be designed for the radiation wavelength corresponding to the transition between the resonant and the ground state.

While the microwave field has a tendency to populate other excited states, this tendency is quenched by the foreign vapor or gas in the plasma so that the first excited state is more heavily populated than would otherwise be the case. Microwave excitation combined with quenching of the more highly excited states, which results from collisions between the foreign gas and the elemental metal or the metal ion in the salt crystals can thus lead to population inversion between the ground state and the metastable resonant state. Hence when the above-mentioned lasing cavity is used, lasing action should ensue.

Because microwave source 24 can continuously supply power to the plasma within tube 13, the metal atoms and ions are continuously excited to provide constant stimulation of emission.

An additional feature of the invention is that pulse coded light radiation can be emitted at will without the use of additional modulators by energizing the microwave source 24 by power pulses with the desired coding. It is well known in the art that indicating pulses with durations down to less than a microsecond and repetition rates in the multikilocycle range can selectively pulse a suitable microwave source 24 into activation. Each time said source is pulsed, it supplies a pulse of microwave energy to resonant cavity 10. Each pulse of microwave energy fed to microwave cavity 10 results in the derivation of coherent light wave from the laser structure for approximately the same period as the input electric pulse, whereby pulse coded light is derived.

Figure 2:
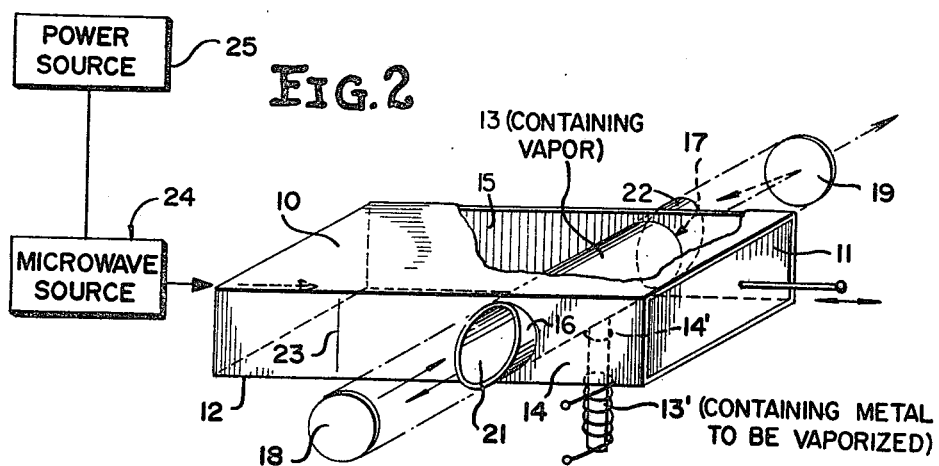
FIGURE 2 is a modification of FIGURE 1 in which a side tubulation connected to the plasma tube is provided in which the metal may be heated by auxiliary means.

FIGURE 2 is a modification of FIGURE 1 wherein the metal to be vaporized, such as magnesium, is placed in a side tube 13' joined on to tube 13, said metal being then heated, e.g., by induction to any desired temperature, which determines the partial pressure introduced into tube 13 from tube 13'. The use of additional heating means makes it preferable, though not absolutely essential, to have tube 13' partially outside microwave cavity 10, entering said cavity through a hole 14' in wall 12 of cavity 10 perpendicular to walls 14 and 15. In view of the limitation on the size of apertures 16 and 17, side tube 13' cannot pass through them. It is obvious therefore that in fabricating the device, the resonant microwave cavity 10 must be assembled in sections around tube 13 and attached to 13'. The mechanism of generation of coherent light and the mode of operation are identical with those described in conjunction with FIGURE 1 except for the higher intensity possible through use of a metal vapor at a higher partial pressure resulting from additional power input, such as needed for induction heating.

Figure 3:
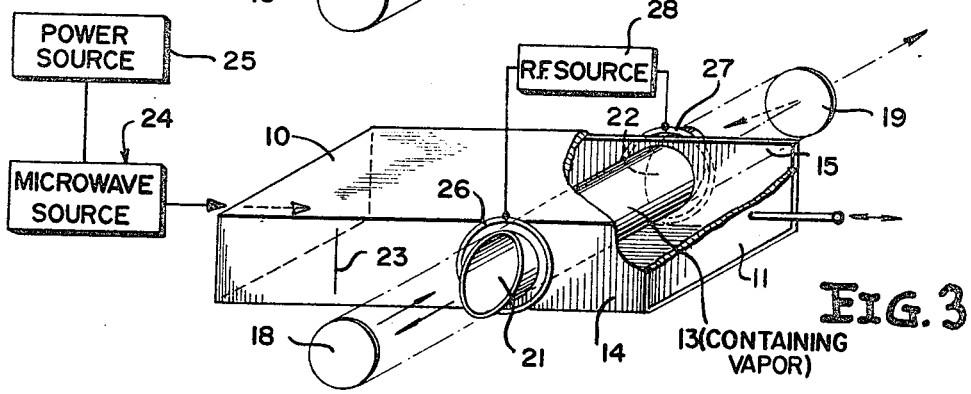
FIGURE 3 is a modification of FIGURE 1 in which a discharge is provided through electrodes external to the tube containing the plasma.

FIGURE 3 is a modification of FIGURE 1 wherein the energy generated by the microwave field is supplemented by a radio frequency discharge from source 28 applied through electrodes 26 and 27 external to tube 13 and at least partially inside microwave cavity 10. These electrodes can be of any shape commonly used in the art. The radio frequency discharge is preferable to a DC discharge, though the latter may be used, since a DC discharge requires the electrodes to be inside the discharge tube where they may sputter and cause contamination. Furthermore, the construction is somewhat more complicated, though well known in the art, since it requires the use of graded seals. If such seals are used, the microwave cavity must again be assembled in sections around the discharge tube 13. Except for the additional energy input, the mode of operation and of generation of coherent light is the same as discussed in conjunction with FIGURE 1. In addition to providing additional energy input through simpler means than the use of a higher power microwave source, this embodiment leads to synergistic action from the combination of the two fields i.e., the efficiency of the radio frequency field is increased.

The use of tube 13' of FIGURE 2 in the embodiment of FIGURE 3 is included within the scope of this invention to provide plural excitations, if desired.

I claim:
1. A system for producing coherent light comprising as the radiating element a plasma containing a substance selected from the class of elemental metals and metal ions having a ground state and a plurality of excited states in which the first excited state is a metastable state, a foreign gas or vapor within said plasma for quenching excitation of excited states other than said metastable state and transferring energy to the metastable state, means for forming and exciting said plasma with microwave energy at a frequency at which said energy is absorbed by said plasma so that said substance undergoes population inversion at its first excited state, and a laser cavity optically coupled to said plasma for reception of light emitted therefrom in response to said excitation thereof.

2. A laser comprising a plasma of a substance selected from the class of elemental metals and metal ions having a ground level and a plurality of higher energy levels in which the first excited state is a metastable state, a foreign gas or vapor admixed with said plasma for quenching excitation of other energy levels than said metastable state, means for forming and exciting said plasma with microwave energy at a frequency at which said energy is absorbed by said plasma so that said substance undergoes population inversion at its first excited state and thereby becomes capable of coherent optical radiation under stimulation, and a laser optical cavity optically coupled with said plasma.

3. The laser of claim 2 wherein said class consists of neutral elemental metals and ions, and including means for establishing an electric discharge in said plasma.

4. The laser of claim 2 further including means for at will pulsing the microwave energy exciting said plasma.

5. The laser of claim 2 wherein said microwave energy is continuously applied to said plasma.

6. The laser of claim 2 wherein formation of said plasma is assisted by additional heating means.

7. The laser of claim 3 wherein formation of said plasma is assisted by additional heating means.

8. A high intensity vapor laser, comprising
a container of vapor of an element having a ground state and a plurality of excited states including a metastable state as the lowest excited state,
a quenching gas admixed with said vapor to transfer energy to said metastable state by quenching the higher excited states upon excitation of said vapor,
pumping means including a source of electromagnetic microwave energy for applying power to said container to produce population inversion to said metastable state,
means including a microwave resonant cavity coupling said pumping means to said container,
said container having a portion thereof transparent to light at the wavelengths to be emitted by said laser, and
a laser cavity optically coupled to said transparent portion of said container.

9. The combination according to claim 9 wherein said container is positioned at least partially within said microwave resonant cavity with an orientation normal to the electric vector of the microwave field in said resonant cavity.

10. The combination according to claim 8 wherein said container is a discharge tube, a further source of electrical energy, and means including electrodes coupling said further source of electrical energy to said tube for application of additional power input to said tube.

11. The combination according to claim 8 wherein is included a further container communicating with the first-named container, said further container having said element therein, and means for heating said further container to vaporize said element and supply said vapor at increased partial pressures to said first-named container.

12. A high intensity coherent source, comprising
a plasma containing a substance selected from the group consisting of metals and metal ions having a plurality of energy levels consisting of a ground state and a plurality of excited states, wherein the lowest of the excited states is a metastable state,
means in said plasma for quenching excitation of preselected energy levels above the ground state to transfer energy to said metastable state,
means including a source of microwaves for applying energy to said plasma for excitation thereof, and production of population inversion to said metastable state, and
an optical cavity for said plasma operative at a wavelength of radiant energy to be transmitted by said light source.

13. A high intensity source of continuous wave coherent radiation, said source comprising
a partially evacuated discharge tube containing a plasma in the form of a vaporized metal having a plurality of energy levels consisting of a ground level and higher energy levels in which the lowest excited state is a metastable state,
microwave means for pumping said plasma to said metastable state and to others of said higher energy levels in a population inversion to said metastable state, said microwave means including a source of microwaves, and a microwave resonant cavity,
said discharge tube extending through said cavity with an orientation normal to the electric vector of the microwave field therein for high coupling to said field, said discharge tube having end walls at least partially transparent to radiation at wavelengths to be emitted, an optical cavity optically coupled to said tube for reception of radiation emitted from said plasma via said end walls, and means within said plasma for quenching said others of said higher energy levels to transfer energy to said metastable state.

14. The combination according to claim 13 wherein is included a further source of electrical energy, and means including electrodes coupling said further source to said tube for application of additional pumping energy to said tube.

15. The combination according to claim 13 wherein is included a further tube communicating with the first-named tube, said further tube having said metal therein, and means for heating said further tube to vaporize said metal and to supply said vapor at increased partial pressures to said first-named tube.

16. A high intensity light source comprising a container of a plasma including a metal or metallic compound having a plurality of excited states, the lowest of said excited states being a metastable state, means including a source of electromagnetic microwave energy for pumping said plasma to effect a population inversion to said metastable state, a quenching agent in said plasma for transferring energy to said metastable state from the other excited states, and an optical cavity coupled to said container for reception and transmission of light relative thereto, said container transparent to microwave energy at the pumping frequencies, and at least partially transparent to light at the wavelengths to be emitted from said plasma in response to said pumping.

17. The combination according to claim 16 further including another source of electrical energy connected to said container for additional pumping excitation of said plasma.

18. The combination according to claim 16 including a source of heat for controlling the partial pressure of the plasma vapor in said container.

References Cited

UNITED STATES PATENTS

| | | | |
|---|---|---|---|
| 2,884,524 | 4/1959 | Dicke. | |
| 3,098,112 | 7/1963 | Horton | 331—94.5 X |
| 3,176,247 | 3/1965 | Fajans. | |

ALFRED L. BRODY, Primary Examiner

U.S. Cl. X.R.

250—199; 330—43; 331—94.5; 332—9